United States Patent
Klahre et al.

(10) Patent No.: US 10,360,245 B2
(45) Date of Patent: Jul. 23, 2019

(54) ATTRIBUTE VALUE DERIVATION

(71) Applicants: Andre Klahre, Schwetzingen (DE); Claus Kollmannsperger, Reilingen (DE); Adelheid Fischer, Walldorf (DE); Wolfgang Walter, Heidelberg (DE); Thorsten Bender, Ludwigshafen (DE)

(72) Inventors: Andre Klahre, Schwetzingen (DE); Claus Kollmannsperger, Reilingen (DE); Adelheid Fischer, Walldorf (DE); Wolfgang Walter, Heidelberg (DE); Thorsten Bender, Ludwigshafen (DE)

(73) Assignee: SAP SE, Walldorf (DE)

( * ) Notice: Subject to any disclaimer, the term of this patent is extended or adjusted under 35 U.S.C. 154(b) by 881 days.

(21) Appl. No.: 14/602,844

(22) Filed: Jan. 22, 2015

(65) Prior Publication Data

US 2016/0217202 A1    Jul. 28, 2016

(51) Int. Cl.
  *G06F 16/28*   (2019.01)
  *G06F 16/23*   (2019.01)
  *G06F 16/9535*  (2019.01)
  *G06F 16/25*   (2019.01)
  *G06F 16/21*   (2019.01)

(52) U.S. Cl.
  CPC ......... *G06F 16/288* (2019.01); *G06F 16/212* (2019.01); *G06F 16/235* (2019.01); *G06F 16/25* (2019.01); *G06F 16/282* (2019.01); *G06F 16/9535* (2019.01)

(58) Field of Classification Search
  CPC ......... G06F 17/30604; G06F 17/30867; G06F 17/30294; G06F 17/30589; 17/30557; G06F 16/9535; G06F 16/235; G06F 16/212; G06F 16/282; G06F 16/288; G06F 16/25
  See application file for complete search history.

(56) References Cited

U.S. PATENT DOCUMENTS

| | | | |
|---|---|---|---|
| 7,051,064 B1 * | 5/2006 | Yamagishi | G06F 17/30589 707/999.102 |
| 2008/0228703 A1 * | 9/2008 | Kenedy | G06Q 40/00 |
| 2009/0012983 A1 * | 1/2009 | Senneville | G06F 17/30566 |

* cited by examiner

*Primary Examiner* — James Trujillo
*Assistant Examiner* — Fatima P Mina
(74) *Attorney, Agent, or Firm* — Mintz Levin Cohn Ferris Glovsky and Popeo, P.C.

(57) ABSTRACT

A system, a method, and a computer program product for deriving target attribute values based on source attributes defined by a hierarchical data mode are disclosed. An attribute value derivation function to change a target attribute data value corresponding to a source attribute stored in a hierarchical data model and an instruction corresponding to the source attribute are provided. The attribute value derivation function is defined by an attribute value derivation header containing metadata describing hierarchical data model and an attribute value derivation instruction for deriving the target attribute based on the source attribute. Using the attribute value derivation function, a target attribute data value is derived. A user interface is generated to display the derived target attribute data value.

20 Claims, 16 Drawing Sheets

⋀ Default:
 ⋀ Source Attribute A: Src. Attrib. Value = 'X1'  Instruction 1  Trg. Attrib. Value 1
  ⋀ Source Attribute B: Src. Attrib. Value = 'ABC1'  Instruction 2  Trg. Attrib. Value 1
  ⋀ Source Attribute B: Src. Attrib. Value = 'ABC2'  Instruction 4  Trg. Attrib. Value 2
   ⋀ Source Attribute C: Src. Attrib. Value = 'K'  Instruction 5  Trg. Attrib. Value 3
   ⋀ Source Attribute C: Src. Attrib. Value = 'L'  Instruction 8  Trg. Attrib. Value 3
 ⋀ Source Attribute A: Src. Attrib. Value = 'X2'  Instruction 9  Trg. Attrib. Value 1
  ⋀ Source Attribute B: Src. Attrib. Value = 'ABC1'  Instruction 3  Trg. Attrib. Value 1
  ⋀ Source Attribute B: Src. Attrib. Value = 'ABC3'  Instruction 6  Trg. Attrib. Value 1
   ⋀ Source Attribute C: Src. Attrib. Value 'K'  Instruction 7  Trg. Attrib. Value 4
                                                    Instruction 10

FIG. 5a.

| AVD Header | | |
|---|---|---|
| AVD header Name | 'AVD1' | |
| Description | 'AVD Header 1' | |
| Flag: "Active" | True | |
| Administrative Data:<br>• Created Date<br>• Changed Date<br>• Created User<br>• Changed User | • 05/05/2014<br>• 05/06/2014<br>• USER1<br>• USER2 | |

| Selection Attribute Names | Value |
|---|---|
| Object Type | 'PROD' |
| Object Group | 'ABC', 'DEF' |

FIG. 5c.

| Source Attribute Hierarchy | Grouping | Source Attribute for Description |
|---|---|---|
| ➤ Product Category | Yes | Product Category Description |
| ➤ Product Subcategory | | |

| Source Attribute | Sequence No. | Group Name |
|---|---|---|
| Product Category | 1 | Group 1 |
| Product Category | 2 | Group 2 |

510

| Group Name | Grouping Filter | Operator | Low Value | High Value |
|---|---|---|---|---|
| Group 1 | Filter 1 | Contains Pattern | '*SWEET*' | |
| Group 1 | Filter 2 | Contains Pattern | '*SUGAR*' | |
| Group 2 | Filter 3 | Starts With | 'DIET' | |

| Target Attribute | Explicit Values | Reference Attributes |
|---|---|---|
| Material Group | Yes | No |
| Material Class | Yes | No |

FIG. 5f.

| Source Attributes | Material Group | Material Class |
|---|---|---|
| ▲ Default Values | A | X |
| • Product Category (Grouping): Group 1 | A | Y |
| • Product Category: SWEET {Sweet Cookies} | A | Z |
| • Product Subcategory: CHOC {Chocolate} | A | X |
| • Product Category: SUGAR {Sugar Cookies} | A | Y |
| • Product Subcategory: CHOC {Chocolate} | A | Y |
| • Product Category (Grouping): Group 2 | B | X |
| • Product Category: DIET {Diet Cookies} | C | X |
| • Product Subcategory: CHOC {Chocolate} | B | X |
| • Product Subcategory: CRÈME {Creme} | A | X |
| • Product Category (Grouping): Other Values | A | X |
| • Product Category: XYZ {Other Cookies} | A | X |
| • Product Subcategory: CRÈME {Creme} | A | X |

514

| Target Attribute | Explicit Values | Reference Attributes |
|---|---|---|
| Material Group | Yes | Yes |

| Source Attributes | Material Group [Explicit Value] | Material Group [Reference Attribute] |
|---|---|---|
| ➢ Default Values | A | |
| • Product Category: SWEET {Sweet Cookies} | | BRAND |
| • Product Subcategory: CHOC {Chocolate} | | |
| • Product Category: DIET {Diet Cookies} | A | BRAND |
| • Product Subcategory: CHOC {Chocolate} | B | |
| • Product Subcategory: CRÈME {Creme} | B | |

ATTRIBUTE VALUE DERIVATION

TECHNICAL FIELD

This disclosure relates generally to data processing and, in particular, to using an attribute value derivation to perform rule-based mapping and derivation of data stored in a hierarchical data model.

BACKGROUND

In today's world, data is vital to operations of many businesses, whether large or small. On regular basis, businesses rely, use, process and/or store vast amounts of data that can be related to businesses' finances, operations, logistics, customers, and many other aspects of their operations. Proper storage of data and fast access to such data are important to smooth operations of the businesses.

Typically, data is stored using hierarchical data models. A hierarchical data model can be a data model that organizes data into a tree-like structure. The data can be stored as records that are connected using links. In some cases, a record can include a collection of fields containing only one value, where the fields can be defined by an entity type. Typically, the hierarchical data model can include parent records and child records (or nodes), where each child record can have only one parent and each parent can have one or more child records. To retrieve data from a hierarchical database, it is necessary to traverse the entire tree beginning with the root node. This process can be compute intensive and time consuming. Thus, there is a need to provide an ability to obtain and display data in accordance with user preferences that does not create a significant computing burden.

SUMMARY

In some implementations, the current subject matter relates to a computer-implemented method for deriving target attribute values based on source attributes defined by a hierarchical data mode. The method can include providing at least one attribute value derivation function to change at least one target attribute data value corresponding to at least one source attribute stored in a hierarchical data model and at least one instruction corresponding to at least one source attribute. The attribute value derivation function can be defined by an attribute value derivation header containing metadata describing hierarchical data model and at least one attribute value derivation instruction for deriving at least one target attribute based on at least one source attribute. The method can further include deriving, using at least one attribute value derivation function, at least one target attribute data value, and generating a user interface for displaying the derived target attribute data value. At least one of the providing, the deriving, and the generating can be performed using at least one processor of at least one computing system.

In some implementations, the current subject matter can include one or more of the following optional features. The attribute value derivation header can include at least one of the following: a metadata describing a hierarchy of source attributes, a grouping of source attributes, metadata describing target attribute data values, and selection criteria for a specified use of the attribute value derivation function. The selection criteria can include at least one grouping containing at least one filter for filtering derivation of the at least one target attribute data value.

In some implementations, the attribute value derivation instruction can be assigned to the attribute value derivation header.

In some implementations, the target attribute data value can be derived using at least one of the following: an explicit value corresponding to a value of at least one source attribute, a reference value corresponding to a value of at least one source attribute, and a functional method.

In some implementations, the attribute value derivation header can include at least one of the following methods: retrieve attribute value derivation headers and/or its components, create attribute value derivation headers, save attribute value derivation headers, modify attribute value derivation headers, copy attribute value derivation headers, delete attribute value derivation headers, activate/deactivate attribute value derivation headers, lock/unlock attribute value derivation headers, retrieve valid source attributes, retrieve valid target attributes, obtain field properties, obtain operation properties, modify a hierarchy of source attributes, modify a hierarchy of reference attributes and the source attribute descriptions, modify target attribute, modify groups and filters, check consistency of source attributes, check consistency of target attributes, check consistency of reference attributes, check consistency of groups, check consistency of filters, and/or any combination thereof.

In some implementations, the attribute value derivation instruction can include at least one of the following methods: retrieve attribute value derivation instruction set(s), retrieve attribute value derivation instruction(s), create attribute value derivation instruction set(s), save attribute value derivation instruction set(s), modify attribute value derivation Instruction set(s), copy attribute value derivation instruction set(s), delete attribute value derivation instruction set(s), provide metadata for attribute value derivation header, create source attribute hierarchy, activate/deactivate attribute value derivation instruction set(s), lock/unlock attribute value derivation instruction set(s), change attribute value derivation instruction(s), retrieve source attribute value(s), retrieve required source attribute(s) for derivation, obtain field property(ies), obtain operation property(ies), cleanup data, reload data, derive target attribute value(s), expand/compress hierarchy of attribute value derivation instruction(s), value help of target attribute(s), modify target attribute(s), delete value(s) of a default instruction, reset attribute value(s) of an instructions, reset attribute value(s) to the value(s) of the corresponding upper level instruction, set attribute value(s) as explicit value(s), set attribute value(s) to an empty value, set/reset filter(s) for source attribute(s) and/or filter(s) for explicit value(s), adopt an instruction set depending on changes to the attribute value derivation header, and/or any combination thereof.

The attribute value derivation instruction can also include an inheritance logic for allowing a first target attribute data value corresponding to a first source attribute at a lower level of the hierarchical data model to inherit a value of a second target attribute data value corresponding to a second source attribute at a higher level of the hierarchical data model, wherein the second source attribute is a parent of the first source attribute.

The source attribute in the hierarchical data model can be defined by a source attribute value and a source attribute description.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary user interface containing an attribute value derivation instruction set and corresponding to the tree structure shown in FIG. 2, according to some implementations of the current subject matter;

FIGS. 5a-5h illustrate exemplary attribute value derivation header and attribute value derivation instruction set, according to some implementations of the current subject matter;

FIG. 6 illustrates an exemplary user interface that can be used to perform maintenance of an attribute value derivation header using general data, according to some implementations of the current subject matter;

FIG. 7 illustrates an exemplary user interface that can be used to perform maintenance of an attribute value derivation instruction set using a hierarchy of source attribute value combinations and explicit and inherited values of target attributes, according to some implementations of the current subject matter;

DETAILED DESCRIPTION

To address these and potentially other deficiencies of currently available solutions, one or more implementations of the current subject matter provide methods, systems, articles or manufacture, and the like that can, among other possible advantages, provide for a use of an attribute value derivation to perform rule-based mapping and derivation of data stored in a hierarchical data model.

Figure 1:
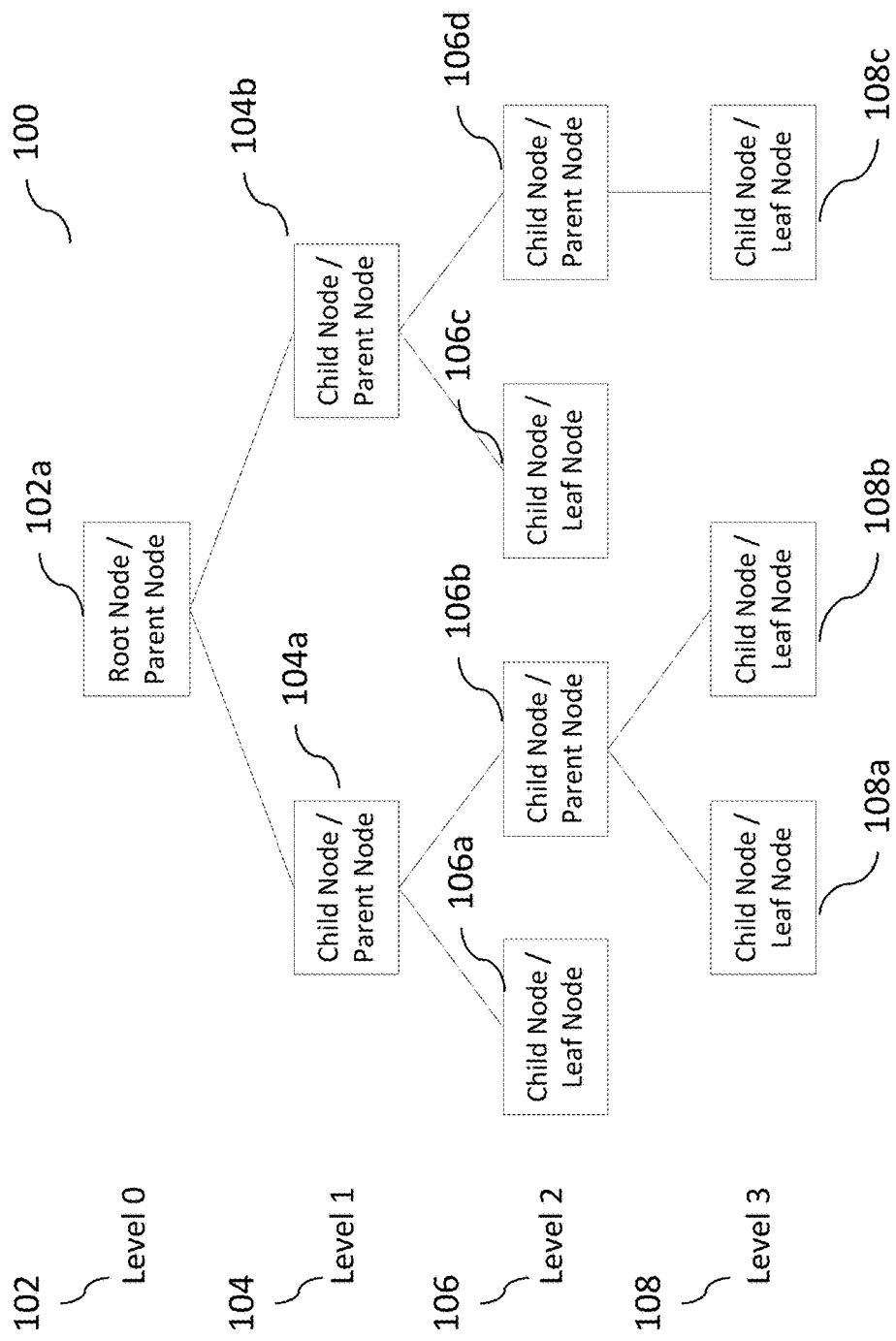
FIG. 1 illustrates an exemplary hierarchical data model, according to some implementations of the current subject matter.

In some implementations, the current subject matter relates to hierarchical data models and ability to maintain attribute values of data stored using a hierarchical data model using an attribute value derivation tool. A hierarchical data model can be a data model in which the data is represented in a tree structure. The elements of the hierarchical data model can be represented by nodes. FIG. 1 illustrates an exemplary hierarchical data model 100, according to some implementations of the current subject matter. The data model 100 can include a plurality of levels 102-108 (i.e., level 0 102, level 1 104, level 2 106, and level 3 108). The data model 100 can allow storage of data at different levels, where the data can be stored in a plurality of nodes. For example, level 0 can include a root or parent node 102a; level 1 can include child nodes/parent nodes 104a and 104b; level 2 can include child nodes/parent nodes 106b, 106d and child nodes/leaf nodes 106a and 106c; level 3 can include child nodes/leaf nodes 108a, 108b, and 108c. A root node 102 typically does not have any parent nodes. A child node can include a parent node and can also include child nodes of its own. A leaf node does not have any child nodes. A child node typically inherits data attributes associated with data that is stored in its parent, grandparent, etc. nodes as well as the root node of the model. Hence, the child node/leaf node 108a can inherit attributes associated with the child node/parent node 106b, child node/parent node 104a, and the root node/parent node 102a.

The nodes in the data model 100 can be connected by branches that can represent parent-child relationship of the nodes. Each parent node can have many child nodes, but each child node has only one parent node. In some implementations, in the data mode, the level can be defined by a hierarchy of nodes and a number of the nodes from the root node down to the leaf nodes. Thus, the level 102 of the root node 102a can be defined as a '0' level; the level 104 of the child nodes 104a-b of the root node 102a can be defined as a level '1'; the level 106 of the child nodes 106a-d of the parent node level 104 can be defined as a level 2; and the level 108 of the child nodes 108a-c of the parent node level 106 can be defined as a level 3.

The attribute value derivation tool can be a generic and reusable tool for rule-based mapping and derivation of data. It can be based on rules for mapping and deriving values for target attributes based on values of source attributes and based on an inheritance logic, which uses default values. It can provide generic interface(s) for accessing source data, for implementations regarding certain behavior(s) and/or for the AVD data layer. The attribute value derivation can provide a user interface to maintain values for the target attributes in a hierarchical set of rules, also called instructions. The values for the target attributes can be defined in a hierarchical set of instructions based on source attribute value combinations of the source attribute hierarchy. The tree structure can include any number of rules.

In some implementations, the attribute value derivation tool can provide at least one of the following functions:
  a generic interface for accessing source data;
  a generic structure of target data;
  a generic interface for implementations regarding certain behavior;
  an inheritance logic of relevant target data values;
  explicit values, attribute references and/or functions for target data;

a grouping function of source data; and/or a user interface with display filters, expandable tree and/or search function.

In some implementations, the current subject matter can provide a user interface that can allow a user to perform various maintenance functions and/or data manipulations of data stored in the hierarchical data model. These functions can effectuate changes of attribute values in the hierarchy of source attribute value combinations. Further, the user interface can provide an overview of the attribute values and the source attribute value combinations of the source attribute hierarchy. The user interface can also allow filtering the rules by given selection criteria, filtering the rules by directly maintained values, and/or expanding the tree of source attributes to a given level. For any of these functions, different recursive filter algorithms can be used.

Figure 2:
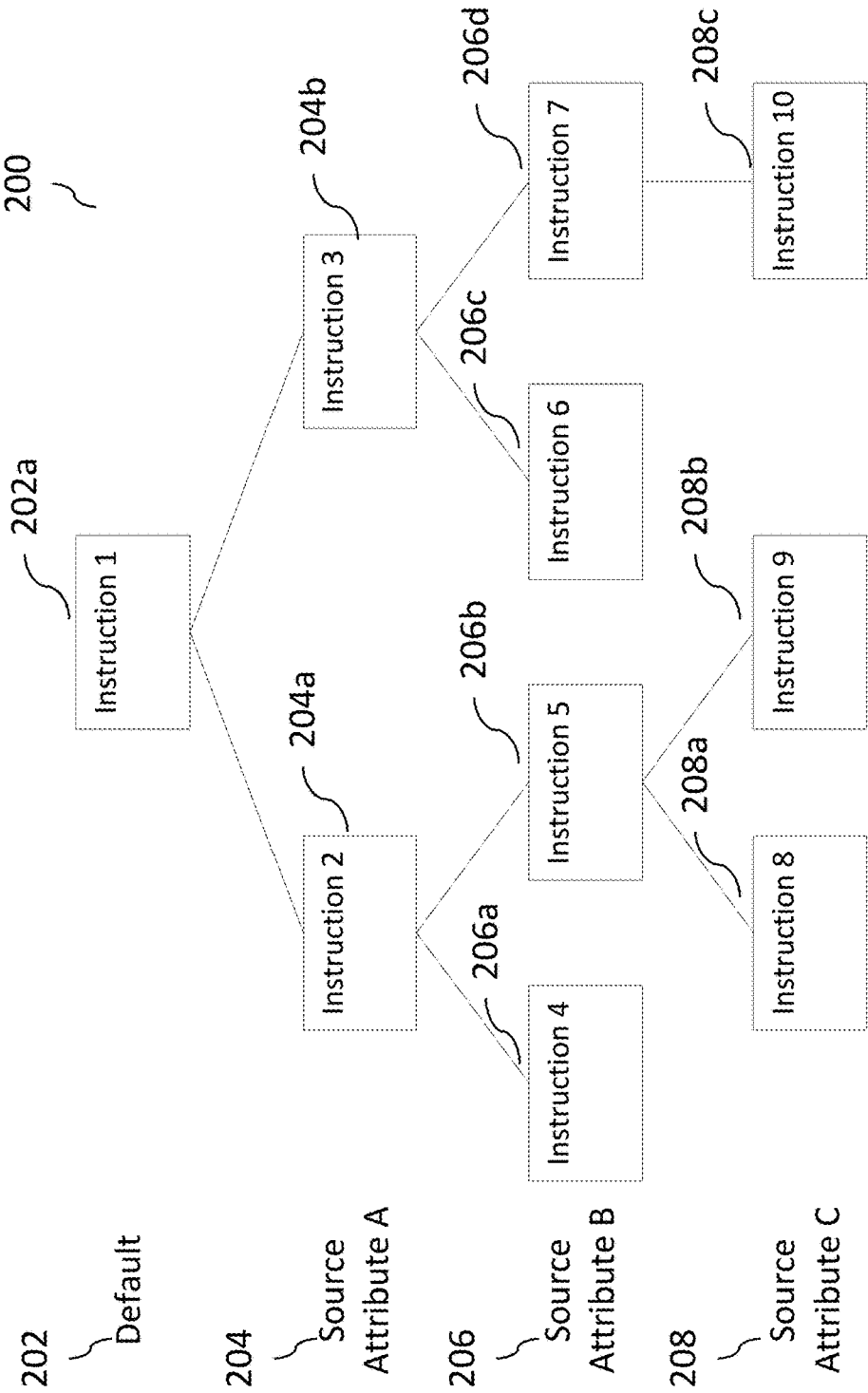
FIG. 2 illustrates an exemplary source attribute hierarchy, according to some implementations of the current subject matter.

FIG. 2 illustrates an exemplary source attribute hierarchy 200, according to some implementations of the current subject matter. The hierarchy 200 can include a default level 202, a source attribute A level 204, a source attribute B level 206, and a source attribute C level 208. The hierarchy can include any number of levels. At each level, there can exist a number of rules or instructions, where child level instructions inherit parent level instructions. As shown in FIG. 2, the default level 202 can include an instruction 1 202a; level 204 can include instruction 2 204a and instruction 3 204b; level 206 can include instruction 3 206a, instruction 4 206b, instruction 5 206c, and instruction 7 206d; level 208 can include instruction 8 208a, instruction 9 208b, and instruction 10 208c. As shown in this figure, instruction 8 208a can inherit instruction 5, instruction 2 and instruction 1. In some implementations, source attributes can be defined in a hierarchy where each level consists of a source attribute to group source attribute value combinations based on a specific value or a grouping such as a selection of source attribute values to individually generate groups of source attribute value combinations.

In some implementations, values for target attributes can be defined in a hierarchical set of instructions, which can be also referred to as an attribute value derivation instruction set ("AVD instruction set"). The definitions of the target attributes can be based on source attribute value combinations of the source attribute hierarchy. Each value of a target attribute of the instruction can be defined by a specific or an explicit value, a reference to a source attribute, or, alternatively can be determined based on a function.

This value can be directly maintained. If it is not directly maintained, then this value can be inherited by the corresponding value of the instruction of the upper level of the source attribute hierarchy. As shown in FIG. 2, the AVD instruction set can include an instruction 202a including overall default values, which can be independent of the values of the source attributes. The AVD instruction set can further include a hierarchical data model where the source attributes (including the groupings) can define a level of the tree (202-208) and the instruction(s) with the source attribute value combinations can define the nodes of the tree (202a-208c). The root node 202a can also be called the default instruction.

FIG. 3 illustrates an exemplary user interface 300 containing an attribute value derivation instruction set and corresponding to the tree structure 200 shown in FIG. 2, according to some implementations of the current subject matter. The user interface 300 illustrates a tree structure where the source attributes (and/or groupings) can define a level of the tree 200 and the source attribute value combinations and the assigned instruction can define the nodes of the tree 200. The assigned instructions can also define target attribute values (by a directly maintained value (highlighted in bold) or by an inherited value). For example, a directly maintained value can be a target attribute value 1 ("Trg. Attrib. Value 1") corresponding to the default instruction 202a. The directly maintained value can also be target attribute value 2 ("Trg. Attrib. Value 2"), target attribute value 3 ("Trg. Attrib. Value 3"), and target attribute value 4 ("Trg. Attrib. Value 4"). Target attribute value 2 can be defined by instruction 4 206a (as shown in FIG. 2) and can be based on the source attribute B 206 that defines a source attribute value of "ABC1". Target attribute value 3 can be defined by instruction 5 206b (as shown in FIG. 2) and can be based on the source attribute B 206 that defines a source attribute value of "ABC2". Target attribute value 4 can be defined by instruction 10 208c (as shown in FIG. 2) and can be based on the source attribute C 208 that defines a source attribute value of "K". Other target attribute values can be inherited attribute values. For example, a target attribute value defined by instruction 2 204a can be based on the source attribute A having a source attribute value of "X1". This target attribute value can be inherited from the corresponding upper level instruction, i.e., instruction 1, so that the target attribute value 1 ("Trg. Attrib. Value 1") can be used as target attribute value for instruction 2. Examples of other inherited attribute values are shown in FIG. 3.

Some of the advantages of the attribute value derivation can include higher degree of automatically generated values by automation of the mapping/derivation process, significant reduction of manual maintenance effort, high usability of the user interface to maintain and check the default values, result of inheritance logic of default values can be visualized directly, more granular mapping of output values, grouping of unstructured data and big data and social media, transparency of business process and of origin of derived values, enablement of multi-level map and reduce functions, connection to distributed database also in the cloud, bridging of system boundaries, as well as any other advantages.

Figure 4:
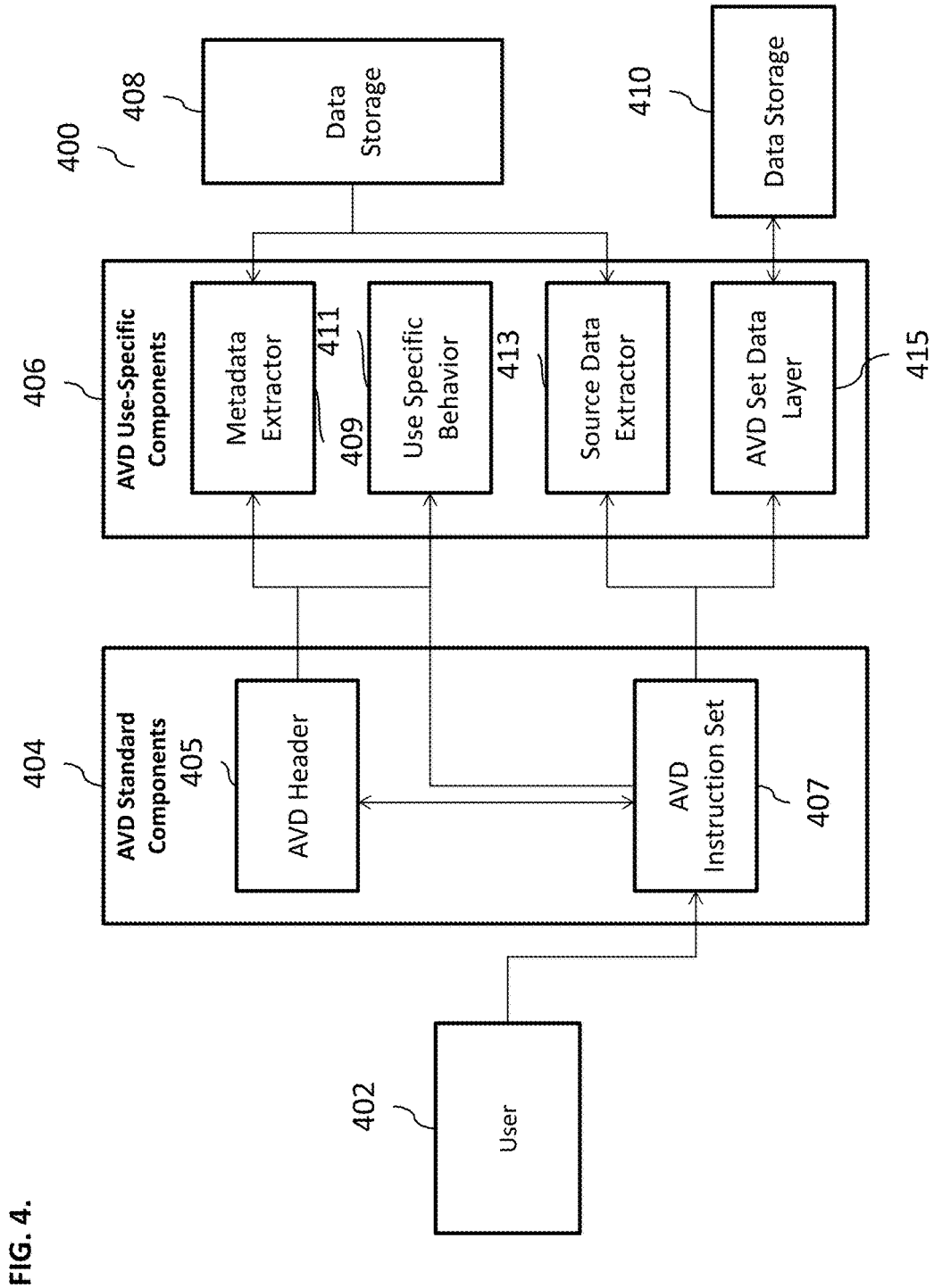
FIG. 4 illustrates an exemplary attribute value derivation architecture, according to some implementations of the current subject matter.

FIG. 4 illustrates an exemplary attribute value derivation architecture 400, according to some implementations of the current subject matter. The architecture can be implemented using software, hardware, and/or any combination of hardware and/or software. The attribute value derivation can be implemented for different use-cases and/or usages, which can allow reuse of AVD as a generic derivation tool for different purposes.

In some implementations, AVD can include standard components 404 and use-case specific components 406. The components include business objects, business processes, business process applications, data, metadata, and/or any other components. The components can be stored and/or accessed by a user 402 from a storage location (e.g., a database, a server, and/or any other location). In some implementations, the standard components can provide standard behavior of the attribute value derivation and the use-case specific components can provide implementations regarding data sources and/or behavior for different use-cases.

In some implementations, the standard components 404 can include an attribute value derivation header component 405 and an attribute value derivation instruction set component 407. The AVD header component 405 and the AVD instruction set component 407 can be business objects that can provide other business objects, business processes, business process application, public methods, and/or any other objects and/or processes their functionality. In some implementations, the AVD header 405 and the AVD instructions set 407 can be associated with one or more user interfaces, which can communicate with these business objects using the public methods. The public methods can also be accessed by other objects, processes, services (e.g., remote services), etc.

In some implementations, the attribute value derivation header 405 can include metadata description of a hierarchy of attributes of the source data including a generic grouping function, the attributes of the target data and the use-cases specific selection criteria. The AVD header 405 can be defined for a specific use-case or usage.

The source data hierarchy can be structured as a hierarchy of source attributes (as shown in FIG. 2). As shown in FIG. 2, each level of this hierarchy can include at least one of the following: a source attribute and a grouping. The source attribute can be used to group the source attribute value combinations based on given values of the source attribute. Another source attribute can be assigned to this source attribute in order to enrich the source attribute name by a description of the source attribute. The grouping can be a generic selection of the source attribute values that can be used to individually build groups of source attribute value combinations. In some implementations, grouping can be optional per source attribute. The grouping can be defined for a source attribute and can include a sequence of groups each having a selection of one or more selection criteria or filters. For every source attribute value of the corresponding source attribute, it can be checked if this value fits to one of the selection criteria of the first group. If this is the case, then this source attribute value can belongs to this group. Otherwise, the selection criteria of the next group can be checked. If a source attribute value does not fit to any of the selection criteria of all groups, then it can belong to an additional group which can be created automatically (which can be referred to as "Others", as discussed below with regard to FIGS. 5*a*-5*h*).

In some implementations, the metadata of the target data can be structured as a set of attributes. For these target attributes, it can be defined if an explicit value can be defined and/or a reference attribute can be defined and/or a formula can be defined to determine a value of a target attribute for a certain instruction. In case of a reference attribute, a set of valid attributes allowed for use as a reference for a specific target attribute can be determined. The formula can be a mathematical function and/or an exit to a functional method.

In some implementations, the attribute value derivation header 405 can be defined for a specific usage and, in addition, for certain values of a set of selection criteria. This set of selection criteria can be determined for each specific usage. The selection criteria can be defined using attribute names of the source data. The AVD header 405 can be determined for one or more values of these selection criteria.

In some implementations, the attribute value derivation header 405 can include a unique key (e.g., by a unique "HeaderID"). The AVD header 405 can include an active flag which controls if the header can be used for derivation. It can also have some administrative data (e.g., created-date data, etc.).

In some implementations, the attribute value derivation header 405 can include public methods. These methods can include at least one of the following: retrieve AVD headers and/or its components (e.g., selection attributes, source attribute hierarchy, target attributes, groups, filters, etc.), create AVD headers, save AVD headers, modify AVD headers, copy AVD headers, delete AVD headers, activate/deactivate AVD headers, lock/unlock AVD headers, retrieve valid source attributes, retrieve valid target attributes, get field properties, get operation properties, etc. The public methods can also include at least one of the following: methods to modify the source attributes hierarchy, the reference attributes and the source attribute descriptions; methods to modify the target attributes; methods to modify the groups and the filters; methods to check the consistency of source attributes, target attributes, reference attributes, groups, filters, as well as any other methods and/or any combination thereof.

In some implementations, the attribute value derivation instruction set 407 can define rules for derivation of values of target data based on values of source data. As discussed above, these rules can be referred to as instructions. An instruction can be applied to a specific value combination of source attributes and can determine values for target data. The AVD instruction set 407 can include an instruction with overall default values, which can be independent of values of source data. The AVD instruction set 407 can be assigned to the AVD header 405. In some implementations, value combinations of the source attribute hierarchy as defined in the AVD header 405 can be retrieved from the relevant source data. This can be performed using a generic interface for accessing the source data. Values of target attributes can be defined for specific source attribute value combinations using at least one of the following:

value of the target attribute can be defined using a specific value (i.e., an explicit value);

value of the target attribute can be obtained from a specific attribute of a particular source data (i.e., a reference attribute); and value of the target attribute can be obtained using a function (i.e., a mathematical function and/or exit to a functional method).

In some implementations, the AVD instruction set 407 can implement inheritance logic, as discussed above. A relevant attribute value for a particular source attribute value combination and a particular target attribute can be determined using inheritance logic. If there is an explicit value, an attribute reference and/or a function can be maintained for the source attribute value combination. Then, this attribute value can be used as the value of the particular target attribute. Otherwise, the corresponding value of the upper level of the hierarchy of the source attribute value combination can be used as an inherited value. This can be an explicit value and/or an inherited value. The inheritance logic can make it possible that only a few target attribute values need to be maintained in order to provide values for all source attribute value combinations. In some implementations, the AVD instruction set 407 can be maintained with target attribute values at default instruction and/or the higher levels of the source attribute value hierarchy and only some target attribute values can be maintained at the lower levels as exceptional values.

In some implementations, the attribute value derivation instruction set 407 can include an inactive instruction set. The inactive instruction set can be used in situation when there are instructions maintained for source attribute value combinations that existed at an earlier point of time but do not exist anymore at the point of time when the maintenance of the AVD instruction set 407 is called. These prior instructions can be retrieved and shown as "inactive" instructions and instructions can be deleted. All instructions of source attribute value combinations that still exist can be referred to as "active" instructions.

The AVD instruction set 407 can include at least one of the following public methods: retrieve AVD instruction set(s), retrieve AVD instruction(s), create AVD instruction set(s), save AVD instruction set(s), modify AVD Instruction set(s), copy AVD instruction set(s), delete AVD instruction set(s), provide metadata for AVD header, create source attribute hierarchy, activate/deactivate AVD instruction set(s), lock/unlock AVD instruction set(s), change AVD instruction(s), retrieve source attribute value(s), retrieve required source attribute(s) for derivation, obtain field property(ies), obtain operation property(ies), cleanup data, reload data, derive target attribute value(s), expand/compress hierarchy of AVD instruction(s), value help of target attribute(s), etc. In some implementations, the AVD instruction set 407 can also include methods to modify target attribute(s), e.g., delete value(s) of a default instruction, reset attribute value(s) of child instructions of a given instruction, reset attribute value(s) to the value(s) of the corresponding upper level instruction, set attribute value(s) as explicit value(s), set attribute value(s) to an empty value, etc. and/or any combination thereof. Additionally, the AVD instruction set 407 can include methods to set/reset filter(s) for source attribute(s) and/or filter(s) for explicit value(s), and/or any combination thereof. Further, the instruction set 407 can include methods to adopt an instruction set depending on changes to the header, e.g., source attribute hierarchy was changed, set of target attributes was changed, header was deleted, header was deactivated and/or activated, reference attributes were changed, groups or filters were changed, etc., and/or any combination thereof.

In some implementations, the use-case specific-components 406 of the attribute value derivation architecture 400, shown in FIG. 4, can include a metadata extractor component 409, a use-case specific behavior component 411, a source data extractor component 413, and an attribute value derivation set data layer component 415. The components 409-415 can receive requisite data and/or information from various storage locations, such as data storage locations 408 and 410.

The metadata extractor 409 can be a use-case specific component that can be accessed by the AVD header component 405 to retrieve use-specific selection fields and/or metadata of attributes.

The use-case specific behavior component 411 can be used to provide use-case specific behavior based on use-case specific implementations that can be used by the AVD header component 405 and the AVD instruction set component 407. These implementations can provide checks on source attribute changes and/or on target attribute changes for the AVD header component 405. For the AVD instruction set 407, these implementations can retrieve valid source attributes and/or valid target attributes, provide valid values of target attributes as a value help, check valid values of target attributes, modify target attribute values for specific actions, etc. and/or any combination thereof.

The source data extractor component 413 can be accessed by the AVD instruction set 407 to retrieve source attribute values to set up source attribute value combinations in the source attribute hierarchy.

The AVD set data layer component 415 can be accessed by the AVD instruction set 407 to access data of AVD instruction set(s) for the purposes of retrieval, modification, deletion, saving, etc. data of the AVD instruction set(s).

FIGS. 5*a*-5*h* illustrate exemplary AVD header and AVD instruction set. The illustrated header and instruction set can be used in conjunction with specific use-case for a mapping of attributes of object data. Depending on the values of certain attributes of the object data, values of a set of given target attributes of the same product data can be derived. In the example shown in FIGS. 5*a*-5*h*, the object data can be product data. An example of this mapping can be as follows: "if a product belongs to the product category 'SWEET' and to the product subcategory 'CHOC', then the material group of this product should be set to 'A' and the material class of this product should be set to 'X'."

FIG. 5*a* illustrates an exemplary AVD header 502. The AVD header 502 can include an AVD header name field ("AVD1"), an AVD header description field ("AVD Header 1"), an AVD header flag field, which can indicate whether or not it is active (as shown in FIG. 5*a*, it is active and having a value of "True"), each of which has a specific value. Additionally, the header can include administrative data fields, e.g., created date field ("05/05/2014"), changed date field ("05/06/2014"), created user field ("USER1"), and changed user field ("USER2").

FIG. 5*b* illustrates a table 504 that can include selection criteria associated with the above mapping. The selection criteria can include two selection attributes: "Object Type" and "Object Group". The "Object Type" can be defined by one value, i.e., 'PROD', as shown in FIG. 5*b*. The "Object Group" can be defined by multiple values, i.e., 'ABC' or 'DEF'.

FIG. 5*c* illustrates a table 506 containing an exemplary source attribute hierarchy. The illustrates source attribute hierarchy can include a source attribute "Product Category" having a grouping (as shown by "Yes" in the Grouping column) and a source attribute "Product Subcategory". The source attribute "Product Category" can include a description, which can be retrieved from the source attribute "Product Category Description".

FIG. 5*d* illustrates two tables 508 and 510 showing grouping of attributes and filters. As shown in table 508, a grouping of the source attribute "Product Category" can be defined by two groups, i.e., "Group 1" and "Group 2". The first group "Group 1" can include two filters ("Filter 1" and "Filter 2" both having operators as "Contains Pattern") that can be assigned with corresponding selection criteria, i.e., all source attribute values of "Product Category" which contain the term "SWEET" or the term "SUGAR" can belong to this group, as shown in table 510. The second group "Group 2" can include one filter ("Filter 3" having an operator "Starts With") assigned with corresponding selection criteria, i.e., all source attribute values of "Product Category" which start with "DIET" can belong to this group. If a source attribute value of "Product Category" starts with "DIET" and contains the pattern "SWEET" or "SUGAR", then this value can be assigned to Group 1 because this group is the first group in the sequence of two groups (as shown in table 508 "Sequence" column). This value would not be assigned to Group 2 (although it also fits to Group 2's filter). As shown in table 508, the sequence number column indicates which group (along with its assigned grouping filters) can be applied first (i.e., Group 1 is applied first, then Group 2 is applied second, as shown in table 508). The "Low Value" and "High Value" in table 510 can also indicate if a particular Group is associated with an operator falling into a particular range, where a "High Value" indicates a high end of the range and a "Low Value" indicates a low end of the range.

In this example, the set of target attributes can include two target attributes "Material Group" and "Material Class", as indicated in table 512 shown in FIG. 5*e*. For both target attributes explicit values can be defined (as indicated by "Yes") and no reference attributes can be defined for these target attributes (as indicated by "No").

FIG. 5*f* illustrates an exemplary table 514 that can include an AVD instruction set that is based on the AVD header information shown in FIGS. 5a-5e. As shown in FIG. 5f, the source attributes can include three category groupings: "Group 1", "Group 2", and "Other Values". Group 1 can include two Product Categories: "SWEET {Sweet Cookies}" and "SUGAR {Sugar Cookies}", each having a Product Subcategory "CHOC {Chocolate}". Group 2 can include one Product Category: "DIET {Diet Cookies}" having two Product Subcategories "CHOC {Chocolate}" and "CREME {Crème}". Group 3 can include one Product Category: "XYZ {Other Cookies}" having one Product Subcategory "CREME {Crème}". The instruction with the default values (Default instruction) is shown at the top of the hierarchy of the source attribute values.

As illustrated in table 514, target attributes are shown as columns in the AVD instruction set. In these columns, target attribute values can be maintained which are valid for the corresponding source attribute value combination in the source attribute hierarchy. There are explicit values that can be defined for the default values of the default instruction (shown in bold letters: "A" for the target attribute "Material Group" (as shown in FIG. 5e) column of table 514 and "X" for the target attribute "Material Class" (as shown in FIG. 5e) column of table 514). In addition, there are explicit values that can be defined at different levels of the source attribute hierarchy, e.g., at the product category "DIET" for the target attribute "Material Group" (e.g., value "B") or at the product subcategory "CHOC" of the product category "DIET" (e.g., value "C") for the target attribute "Material Group" or at the product category group "Group 1" for the target attribute "Material Class" (e.g., value "Y").

In some implementations, if no explicit value is maintained for a certain instruction, then the inheritance logic can be applied, i.e., the value of the instruction of the corresponding upper level in the hierarchy of the source attribute value combinations can be the relevant value for the particular instruction. The value which is inherited can be an explicit value and/or an inherited value.

As shown in FIG. 5f, there is no explicit value maintained at the source attribute value "Product Category (Grouping): Group 1" for the target attribute "Material Group". Thus, the value can be inherited from the corresponding upper level, which, in this case, is the default instruction, i.e., value "A" (as shown in italics). Further, there is no explicit value maintained at the source attribute value "Product Category: SWEET" of the source attribute value "Product Category (Grouping): Group 1" for the target attribute "Material Group". Thus, the value can be obtained from the upper level instruction of the source attribute value "Product Category (Grouping): Group 1", i.e., value "A" (which is an inherited value, as shown in italics).

Figure 5H:

FIGS. 5g-5h illustrate an exemplary use of a combination of explicit and reference attributes. FIG. 5g illustrates an exemplary AVD header table 516 that indicates that the target attribute "Material Group" has an explicit value(s) and a reference attribute(s). FIG. 5h illustrates an exemplary table 518 showing an exemplary AVD instruction set. The source attribute hierarchy can include a source attribute "Product Category" and a source attribute "Product Subcategory" (i.e., "Product Category: SWEET {Sweet Cookies}" can include "Product Subcategory: CHOC {Chocolate}" and "Product Category: DIET {Diet Cookies}" can include "Product Subcategory: CHOC {Chocolate}" and "Product Subcategory: CREME {Crème}"). The target attribute is "Material Group". For this target attribute both explicit value and a reference attribute are allowed, as shown in table 516 shown in FIG. 5g and by the last two columns in table 518 shown in FIG. 5h.

As shown in FIG. 5h, the AVD instruction set can contain source attributes with corresponding target attributes having either an explicit value (e.g., "A" for the default values) or a reference attribute defined (e.g., "BRAND" for the product category "SWEET"). If no explicit value and no reference attribute is maintained for a certain instruction, an inheritance logic can be applied (e.g., "BRAND" (shown in italics) for the product subcategory "CHOC" as inherited from the product category "SWEET" (shown in bold) or "B" (shown in italics) for the product subcategory "CREME" as inherited from the product category "DIET" (shown in bold)).

Referring back to FIG. 4, the metadata extractor component 409 can retrieve the use-case specific selection fields "Object Type" and "Object Group". The source data extractor component 413 can access a product database (e.g., data storage 408) and obtain product data which can fit selection attributes of the AVD Header, i.e., Object Type="PROD" and Object Group="ABC" or "DEF" and can obtain value combinations of specific source attributes "Product Category" and "Product Subcategory", i.e., "SWEET"/ "CHOC", "SUGAR"/"CHOC", etc. The use-case specific behavior component 411 can perform at least one of the following: a check of valid source attributes and valid target attributes to determine that a source attribute is not also used as a target attribute and vice versa, a check of valid combinations of the values of the Material Group and the Material Class (e.g., the value combination "B" and "X" for Material Group and Material Class can be allowed but the value combination "B" and "Z" is not allowed (this check is called when the explicit values are maintained in the AVD instruction set)), a value help that can provide valid value combinations for the Material Group and the Material Class, etc. and/or any combination thereof. The AVD set data layer component 415 can be a database that can store data of the AVD instruction set 407.

Figure 6:
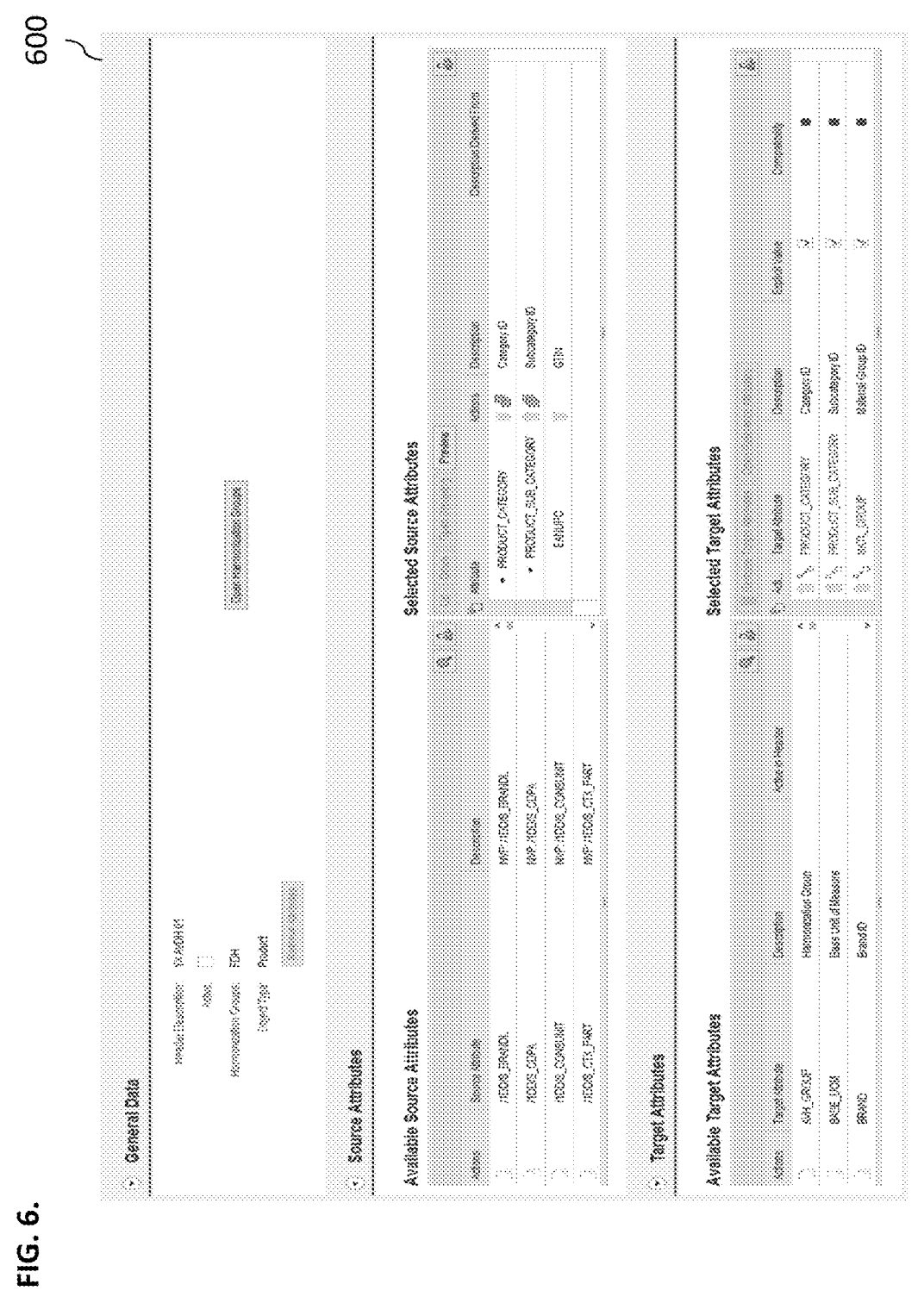

FIG. 6 illustrates an exemplary user interface 600 that can be used to perform maintenance of an AVD header using the general data, the values of the selection attributes, the source attribute hierarchy and the target attributes.

Figure 7:
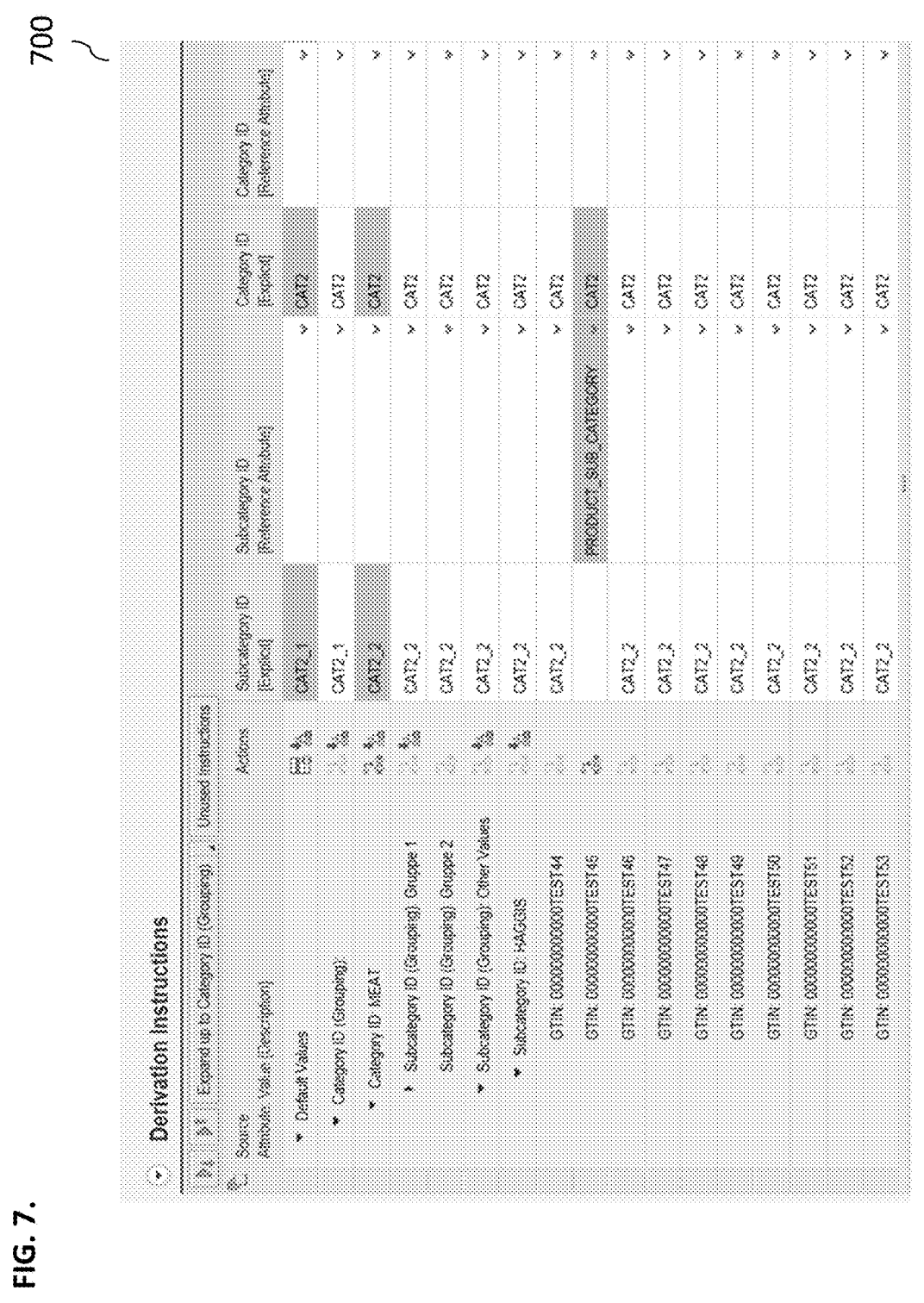

FIG. 7 illustrates an exemplary user interface 700 that can be used to perform maintenance of an AVD instruction set using a hierarchy of source attribute value combinations and explicit and inherited values of target attributes (as explicit value and/or as reference attribute).

Figure 8:
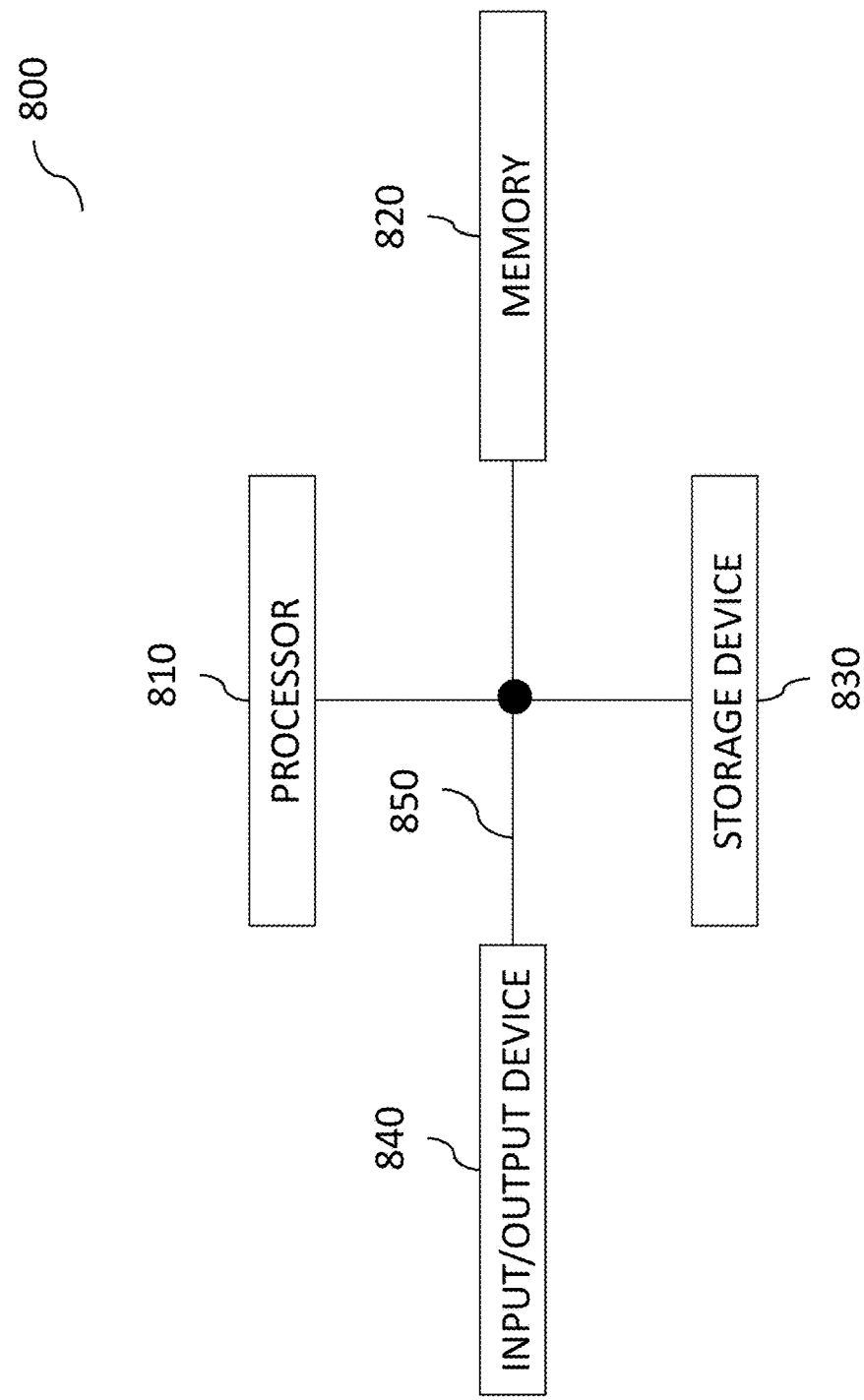
FIG. 8 is an exemplary system, according to some implementations of the current subject matter.

In some implementations, the current subject matter can be configured to be implemented in a system 800, as shown in FIG. 8. The system 800 can include a processor 810, a memory 820, a storage device 830, and an input/output device 840. Each of the components 810, 820, 830 and 840 can be interconnected using a system bus 850. The processor 810 can be configured to process instructions for execution within the system 800. In some implementations, the processor 810 can be a single-threaded processor. In alternate implementations, the processor 810 can be a multi-threaded processor. The processor 810 can be further configured to process instructions stored in the memory 820 or on the storage device 830, including receiving or sending information through the input/output device 840. The memory 820 can store information within the system 800. In some implementations, the memory 820 can be a computer-readable medium. In alternate implementations, the memory 820 can be a volatile memory unit. In yet some implementations, the memory 820 can be a non-volatile memory unit. The storage device 830 can be capable of providing mass storage for the system 800. In some implementations, the storage device 830 can be a computer-readable medium. In alternate implementations, the storage device 830 can be a floppy disk device, a hard disk device, an optical disk device, a tape device, non-volatile solid state memory, or any other type of storage device. The input/output device 840 can be configured to provide input/output operations for the system 800. In some implementations, the input/output device 840 can include a keyboard and/or pointing device. In alternate implementations, the input/output device 840 can include a display unit for displaying graphical user interfaces.

Figure 9:
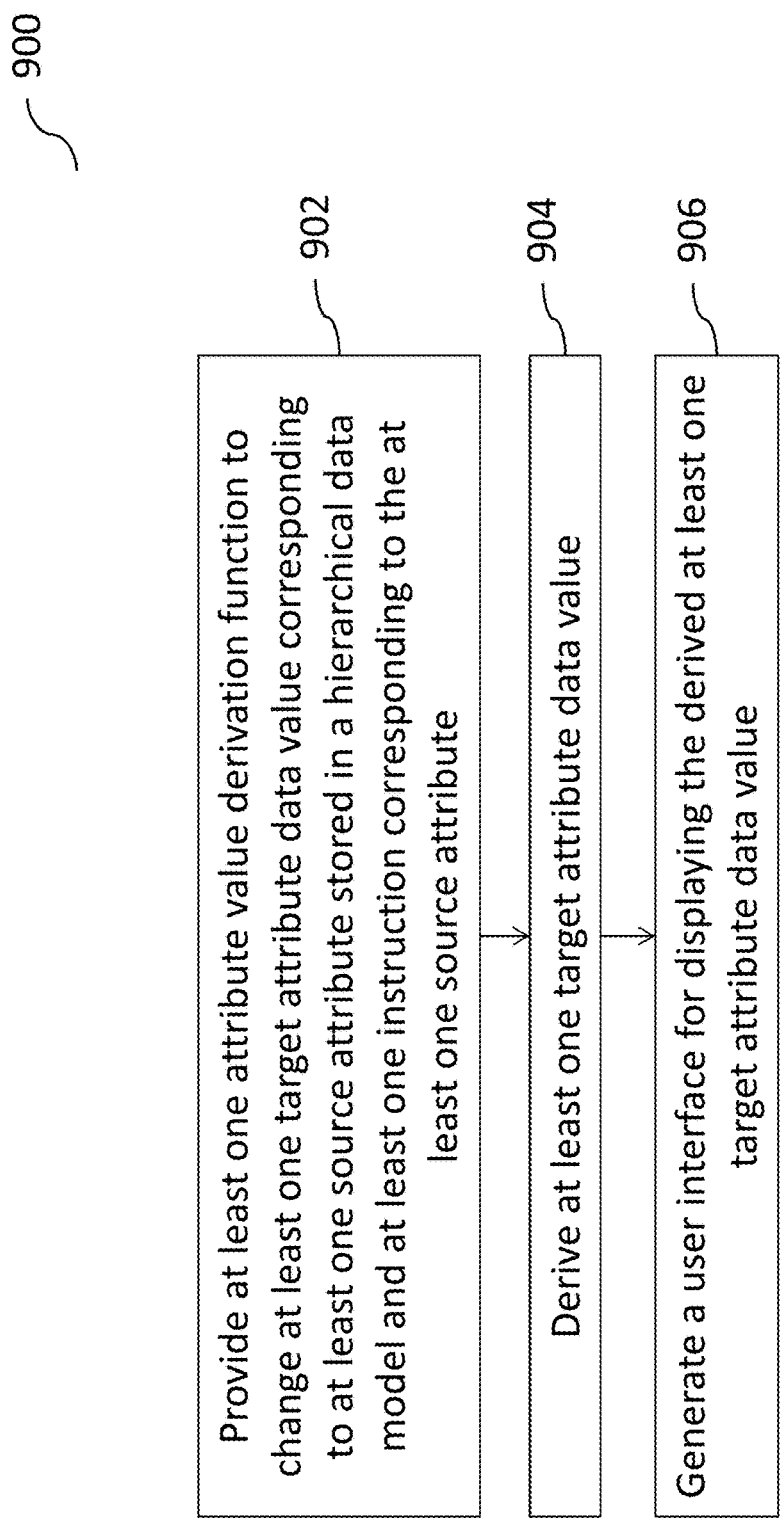
FIG. 9 is an exemplary method, according to some implementations of the current subject matter.

FIG. 9 illustrates an exemplary method 900 for deriving target attribute values based on source attributes defined by a hierarchical data mode, according to some implementations of the current subject matter. At 902, at least one attribute value derivation function for changing at least one target attribute data value corresponding to at least one source attribute stored in a hierarchical data model and at least one instruction corresponding to the at least one source attribute can be provided. The attribute value derivation function can be defined by an attribute value derivation header (e.g., AVD header 405 shown in FIG. 4) that can include metadata describing hierarchical data model and at least one attribute value derivation instruction (e.g., which can be part of the AVD instruction set 407 shown in FIG. 4) for deriving the at least one target attribute based on the at least one source attribute. At 904, the target attribute data value can be derived based on the above function. At 906, a user interface for displaying the derived target attribute data value can be generated.

In some implementations, the current subject matter can include one or more of the following optional features. The attribute value derivation header can include at least one of the following: a metadata describing a hierarchy of source attributes, a grouping of source attributes, metadata describing target attribute data values, and selection criteria for a specified use of the attribute value derivation function. The selection criteria can include at least one grouping containing at least one filter for filtering derivation of the at least one target attribute data value.

In some implementations, the attribute value derivation instruction can be assigned to the attribute value derivation header.

In some implementations, the target attribute data value can be derived using at least one of the following: an explicit value corresponding to a value of at least one source attribute, a reference value corresponding to a value of at least one source attribute, and a functional method.

In some implementations, the attribute value derivation header can include at least one of the following methods: retrieve attribute value derivation headers and/or its components, create attribute value derivation headers, save attribute value derivation headers, modify attribute value derivation headers, copy attribute value derivation headers, delete attribute value derivation headers, activate/deactivate attribute value derivation headers, lock/unlock attribute value derivation headers, retrieve valid source attributes, retrieve valid target attributes, obtain field properties, obtain operation properties, modify a hierarchy of source attributes, modify a hierarchy of reference attributes and the source attribute descriptions, modify target attribute, modify groups and filters, check consistency of source attributes, check consistency of target attributes, check consistency of reference attributes, check consistency of groups, check consistency of filters, and/or any combination thereof.

In some implementations, the attribute value derivation instruction can include at least one of the following methods: retrieve attribute value derivation instruction set(s), retrieve attribute value derivation instruction(s), create attribute value derivation instruction set(s), save attribute value derivation instruction set(s), modify attribute value derivation Instruction set(s), copy attribute value derivation instruction set(s), delete attribute value derivation instruction set(s), provide metadata for attribute value derivation header, create source attribute hierarchy, activate/deactivate attribute value derivation instruction set(s), lock/unlock attribute value derivation instruction set(s), change attribute value derivation instruction(s), retrieve source attribute value(s), retrieve required source attribute(s) for derivation, obtain field property(ies), obtain operation property(ies), cleanup data, reload data, derive target attribute value(s), expand/compress hierarchy of attribute value derivation instruction(s), value help of target attribute(s), modify target attribute(s), delete value(s) of a default instruction, reset attribute value(s) of an instructions, reset attribute value(s) to the value(s) of the corresponding upper level instruction, set attribute value(s) as explicit value(s), set attribute value(s) to an empty value, set/reset filter(s) for source attribute(s) and/or filter(s) for explicit value(s), adopt an instruction set depending on changes to the attribute value derivation header, and/or any combination thereof.

The attribute value derivation instruction can also include an inheritance logic for allowing a first target attribute data value corresponding to a first source attribute at a lower level of the hierarchical data model to inherit a value of a second target attribute data value corresponding to a second source attribute at a higher level of the hierarchical data model, wherein the second source attribute is a parent of the first source attribute.

The source attribute in the hierarchical data model can be defined by a source attribute value and a source attribute description.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
providing at least one attribute value derivation function to change at least one target attribute data value corresponding to at least one source attribute stored in a first level of a hierarchical data model and at least one instruction corresponding to the at least one source attribute, the attribute value derivation function is being defined by an attribute value derivation header containing metadata describing the hierarchical data model and at least one attribute value derivation instruction for changing the at least one target attribute data value based on the at least one source attribute;
determining whether the at least one target attribute value is based on an explicit value corresponding to a first value of the at least one source attribute, a reference value corresponding to a second value of a second source attribute, and/or a functional method;
changing, in response to the determining and based on the at least one attribute value derivation function, the at least one target attribute data value, the at least one attribute value derivation function including inheritance logic of a second instruction of a second source attribute stored in a second level of the hierarchical data model, the second level being higher than the first level of the hierarchical data model;
determining, at a use-case specific behavior component, whether the changed at least one target attribute data value comprises a valid value; and
generating a user interface for displaying the changed at least one target attribute data value;
wherein the at least one of the providing, the determining, the changing, the determining, and the generating is performed using at least one processor of at least one computing system.

2. The method according to claim 1, wherein the attribute value derivation header includes a metadata describing a hierarchy of source attributes, a grouping of source attributes, metadata describing target attribute data values, and/or selection criteria for a specified use of the attribute value derivation function;

wherein the selection criteria includes at least one grouping containing at least one filter for filtering derivation of the at least one target attribute data value.

3. The method according to claim 1, wherein the at least one attribute value derivation instruction is assigned to the attribute value derivation header.

4. The method according to claim 1, wherein the attribute value derivation header includes at least one of the following methods: retrieve attribute value derivation headers and/or its components, create attribute value derivation headers, save attribute value derivation headers, modify attribute value derivation headers, copy attribute value derivation headers, delete attribute value derivation headers, activate/deactivate attribute value derivation headers, lock/unlock attribute value derivation headers, retrieve valid source attributes, retrieve valid target attributes, obtain field properties, obtain operation properties, modify a hierarchy of source attributes, modify a hierarchy of reference attributes and the source attribute descriptions, modify target attribute, modify groups and filters, check consistency of source attributes, check consistency of target attributes, check consistency of reference attributes, check consistency of groups, check consistency of filters, and/or any combination thereof.

5. The method according to claim 1, wherein the at least one attribute value derivation instruction includes at least one of the following methods: retrieve attribute value derivation instruction set(s), retrieve attribute value derivation instruction(s), create attribute value derivation instruction set(s), save attribute value derivation instruction set(s), modify attribute value derivation Instruction set(s), copy attribute value derivation instruction set(s), delete attribute value derivation instruction set(s), provide metadata for attribute value derivation header, create source attribute hierarchy, activate/deactivate attribute value derivation instruction set(s), lock/unlock attribute value derivation instruction set(s), change attribute value derivation instruction(s), retrieve source attribute value(s), retrieve required source attribute(s) for derivation, obtain field property(ies), obtain operation property(ies), cleanup data, reload data, derive target attribute value(s), expand/compress hierarchy of attribute value derivation instruction(s), value help of target attribute(s), modify target attribute(s), delete value(s) of a default instruction, reset attribute value(s) of an instructions, reset attribute value(s) to the value(s) of the corresponding upper level instruction, set attribute value(s) as explicit value(s), set attribute value(s) to an empty value, set/reset filter(s) for source attribute(s) and/or filter(s) for explicit value(s), adopt an instruction set depending on changes to the attribute value derivation header, and/or any combination thereof.

6. The method according to claim 1, wherein the determining indicates that the target attribute data value is not based on the explicit value, the reference value, and/or the functional method.

7. The method according to claim 1, wherein the at least one source attribute in the hierarchical data model is defined by a source attribute value and a source attribute description, wherein the at least one attribute derivation instruction defines rules for changing the at least one target attribute data based on the source attribute value.

8. A system comprising:
    at least one programmable processor; and
    a machine-readable medium storing instructions that, when executed by the at least one programmable processor, cause the at least one programmable processor to perform operations comprising:
        providing at least one attribute value derivation function to change at least one target attribute data value corresponding to at least one source attribute stored in a first level of a hierarchical data model and at least one instruction corresponding to the at least one source attribute, the attribute value derivation function is being defined by an attribute value derivation header containing metadata describing the hierarchical data model and at least one attribute value derivation instruction for changing the at least one target attribute data value based on the at least one source attribute;
        determining whether the at least one target attribute value is based on an explicit value corresponding to a first value of the at least one source attribute, a reference value corresponding to a second value of a second source attribute, and/or a functional method;
        changing, in response to the determining and based on the at least one attribute value derivation function, the at least one target attribute data value, the at least one attribute value derivation function including inheritance logic of a second instruction of a second source attribute stored in a second level of the hierarchical data model, the second level being higher than the first level of the hierarchical data model;
        determining, at a use-case specific behavior component, whether the changed at least one target attribute data value comprises a valid value; and
        generating a user interface for displaying the changed at least one target attribute data value.

9. The system according to claim 8, wherein the attribute value derivation header includes a metadata describing a hierarchy of source attributes, a grouping of source attributes, metadata describing target attribute data values, and/or selection criteria for a specified use of the attribute value derivation function;

wherein the selection criteria includes at least one grouping containing at least one filter for filtering derivation of the at least one target attribute data value.

10. The system according to claim 8, wherein the at least one attribute value derivation instruction is assigned to the attribute value derivation header.

11. The system according to claim 8, wherein the attribute value derivation header includes at least one of the following methods: retrieve attribute value derivation headers and/or its components, create attribute value derivation headers, save attribute value derivation headers, modify attribute value derivation headers, copy attribute value derivation headers, delete attribute value derivation headers, activate/deactivate attribute value derivation headers, lock/unlock attribute value derivation headers, retrieve valid source attributes, retrieve valid target attributes, obtain field properties, obtain operation properties, modify a hierarchy of source attributes, modify a hierarchy of reference attributes and the source attribute descriptions, modify target attribute, modify groups and filters, check consistency of source attributes, check consistency of target attributes, check consistency of reference attributes, check consistency of groups, check consistency of filters, and/or any combination thereof.

12. The system according to claim 8, wherein the at least one attribute value derivation instruction includes at least one of the following methods: retrieve attribute value derivation instruction set(s), retrieve attribute value derivation instruction(s), create attribute value derivation instruction set(s), save attribute value derivation instruction set(s), modify attribute value derivation Instruction set(s), copy attribute value derivation instruction set(s), delete attribute value derivation instruction set(s), provide metadata for attribute value derivation header, create source attribute hierarchy, activate/deactivate attribute value derivation instruction set(s), lock/unlock attribute value derivation instruction set(s), change attribute value derivation instruction(s), retrieve source attribute value(s), retrieve required source attribute(s) for derivation, obtain field property(ies), obtain operation property(ies), cleanup data, reload data, derive target attribute value(s), expand/compress hierarchy of attribute value derivation instruction(s), value help of target attribute(s), modify target attribute(s), delete value(s) of a default instruction, reset attribute value(s) of an instructions, reset attribute value(s) to the value(s) of the corresponding upper level instruction, set attribute value(s) as explicit value(s), set attribute value(s) to an empty value, set/reset filter(s) for source attribute(s) and/or filter(s) for explicit value(s), adopt an instruction set depending on changes to the attribute value derivation header, and/or any combination thereof.

13. The system according to claim 8, wherein the determining indicates that the target attribute data value is not based on the explicit value, the reference value, or the functional method.

14. The system according to claim 8, wherein the at least one source attribute in the hierarchical data model is defined by a source attribute value and a source attribute description, wherein the at least one attribute derivation instruction defines rules for changing the at least one target attribute data based on the source attribute value.

15. A computer program product comprising a non-transitory machine-readable medium storing instructions that, when executed by at least one programmable processor, cause the at least one programmable processor to perform operations comprising:

providing at least one attribute value derivation function to change at least one target attribute data value corresponding to at least one source attribute stored in a first level of a hierarchical data model and at least one instruction corresponding to the at least one source attribute, the attribute value derivation function is being defined by an attribute value derivation header containing metadata describing the hierarchical data model and at least one attribute value derivation instruction for changing the at least one target attribute data value based on the at least one source attribute;

determining whether the at least one target attribute value is based on an explicit value corresponding to a first value of the at least one source attribute, a reference value corresponding to a second value of a second source attribute, and/or a functional method;

changing, in response to the determining and based on the at least one attribute value derivation function, the at least one target attribute data value, the at least one attribute value derivation function including inheritance logic of a second instruction of a second source attribute stored in a second level of the hierarchical data model, the second level being higher than the first level of the hierarchical data model;

determining, at a use-case specific behavior component, whether the changed at least one target attribute data value comprises a valid value; and generating a user interface for displaying the changed at least one target attribute data value.

16. The computer program product according to claim 15, wherein the attribute value derivation header includes a metadata describing a hierarchy of source attributes, a grouping of source attributes, metadata describing target attribute data values, and/or selection criteria for a specified use of the attribute value derivation function;

wherein the selection criteria includes at least one grouping containing at least one filter for filtering derivation of the at least one target attribute data value.

17. The computer program product according to claim 15, wherein the at least one attribute value derivation instruction is assigned to the attribute value derivation header, wherein the at least one source attribute in the hierarchical data model is defined by a source attribute value and a source attribute description, wherein the at least one attribute derivation instruction defines rules for changing the at least one target attribute data based on the source attribute value.

18. The method according to claim 1, further comprising modifying the derived target attribute data value in response to determining the derived target attribute data value comprises an invalid value.

19. The system according to claim 8, the operations further comprising modifying the derived target attribute data value in response to determining the derived target attribute data value comprises an invalid value.

20. The computer program product according to claim 15, the operations further comprising modifying the derived target attribute data value in response to determining the derived target attribute data value comprises an invalid value.

* * * * *